Sept. 27, 1960   W. T. ANDERSON   2,954,118
GUARD FOR PROTECTING THE CUTTING EDGES OF SAW BLADES
Filed June 23, 1958

Inventor,
William T. Anderson
By [signature]
Attorney

United States Patent Office 2,954,118
Patented Sept. 27, 1960

2,954,118
GUARD FOR PROTECTING THE CUTTING EDGES OF SAW BLADES

William T. Anderson, Prairie View, Ill., assignor to The Doall Company, Des Plaines, Ill., a corporation of Illinois Filed June 23, 1958, Ser. No. 743,772

3 Claims. (Cl. 206—59)

This invention relates to saws generally, and has as its principal object the provision of a guard which is readily applicable to the cutting edges of saws and especially those of band saw blades to protect the same against damage during the latter stages of their manufacture, during shipment, and during customer storage and handling.

The cutting edges of saw blades, and particularly those of high speed band saw blades for cutting metal, may be considered as comprised of a series of high quality precision cutting tools. For that reason considerable care is ordinarily exercised during manufacture of band saw blades not only to provide them with the desired high quality precision cutting edge but to minimize damage to the saw teeth especially during the final stages of manufacture and the handling of the blades incidental to packaging for shipment to the customer.

Despite the precautions that were taken in the past, damage frequently resulted to the toothed edges and even the sides or faces of the saw blades. In addition, persons handling the saw blades either just prior to shipment to the customer, or after receipt by the customer, sometimes suffered painful wounds inflicted by the sharp teeth on the cutting edge of the blade.

Some of the damage to the saw teeth and the injuries inflicted thereby resulted from the practice of winding or rolling up the saw bands into coils for shipment and/or storage. When so coiled the teeth on adjacent convolutions of the band are brought into rubbing contact with one another in a most undesirable manner, and they often scratch or score the faces of the adjacent convolutions in the event the latter shift edgewise in the coil. Injury inflicted by the teeth of the saw band usually occurs during the manual handling of the band necessary to coil or uncoil it or to insert coiled saw bands into their shipping packages.

It is the purpose of this invention, therefore, to provide a guard for the toothed edge of a saw blade by which complete protection will be afforded the cutting edge of the blade to assure the sharpness and accuracy of the blade when it reaches the customer.

More specifically it is the purpose of this invention to provide a guard of the character described which comprises a narrow channel shaped sheath of tough but flexible and somewhat resilient material, such as plastic of a known type, which though readily applicable to the cutting edge of most saw blades is especially valuable for use in connection with metal cutting band saw blades to minimize the danger of injury to persons who must handle the blades, and to also protect the precision cutting edges of the blades against damage during the final stages of their manufacture, during coiling and uncoiling of the blades, and during shipment of the coiled bands.

A further purpose of this invention resides in the provision of a narrow channel shaped guard or sheath of the character described having a web portion which overlies the tips of the teeth and opposite flanges which embrace the sides of the teeth when the guard is in place on the cutting edge of the saw blade, and wherein the flanges of the sheath extend beyond the roots of the teeth and substantially clamp the toothed edged portions of the blade therebetween, so that the set of the teeth the flanges of the guard cooperate with the set of the teeth to assure against accidental displacement of the guard from the blade.

An important advantage which derives from the installation of the guard of this invention on the cutting edge of a band saw blade is that the guard, being flexible, does not interfere with coiling of the band for shipment and/or storage, and when coiled with the band prevents damaging contact between the teeth of adjacent convolutions.

Still another purpose of this invention resides in the provision of a tough but flexible guard for the cutting edges of band saw blades wherein the guard is not only capable of retaining its protective position on the toothed edge of the blade when the latter is coiled for shipment or storage, but also has means formed on the sides thereof which interengage and lock together the contiguous convolutions of the guard to thus inhibit edgewise displacement of the convolutions of the coiled saw blade.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiments of the invention constructed according to the best modes so far devised for the practical application of the principles thereof, and in which.

Figure 1:
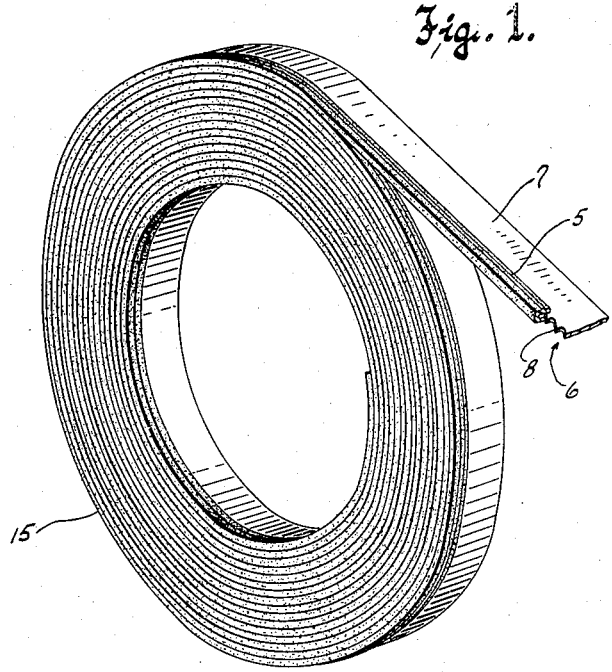
Figure 1 is a perspective view of a partly coiled band saw blade having the guard of this invention in place and protectively covering the cutting edge of the blade.

Referring now more particularly to the accompanying drawing, wherein like reference characters have been applied to like parts throughout the several views, the guard 5 of this invention has been shown by way of example as applied to the cutting edge 6 of a band saw blade 7 of the type used for cutting metal. As is customary, the cutting edge 6 of the blade comprises a series of precision formed teeth 8 substantially uniformly spaced apart along one edge of the blade and having the usual set or side bending applied to alternate teeth, for example, to effect the cutting of a kerf wider than the thickness of the body portion of the band from which the teeth project.

The guard 5 is a narrow channel shaped extruded sheath of a tough but flexible and somewhat resilient plastic material such as polyethylene or its equivalent, having a length substantially equal to the length of the cutting edge on the saw blade to be protected by the guard. Due to its channel shaped configuration, the guard, when applied to the cutting edge of the blade as seen best in Figure 2, has a narrow web portion 10 which transversely overlies the tips of the teeth 8 on the cutting edge of the blade, and opposite flanges 11 which project from the web 10 to flatwise overlie a substantial portion of the saw blade along its toothed edge.

Figure 3:
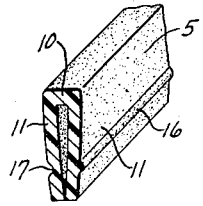
Figure 3 is an enlarged fragmentary view partly in cross-section and partly in perspective of the guard per se.

The depth of the channel shaped guard or sheath may be on the order of twice the height of the teeth 8, to insure that the flanges of the guard will extend beyond the roots of the teeth 8 to overlie and engage against a substantial area of the opposite faces of the body of the blade inwardly of its cutting edge. Also, as best indicated in Figure 3, the space between the flanges 11, at their junctions with the web 10, is no greater than the thickness of the saw blade to be protected by the guard, and in addition the guard is so formed that when free the flanges converge toward one another. As a result, the flanges 11 of the guard must be flexed apart and tensioned during the application of the guard to the cutting edge of the blade, and such tensioning of the flanges assures that they will clampingly engage over the cutting edge portion of the blade when the guard is in position thereon.

Moreover, due to the set or side bending of the teeth 8, the blade will have an effective width along the extremities of its teeth which is greater than the maximum internal width of the channel shaped guard.

Figure 2:
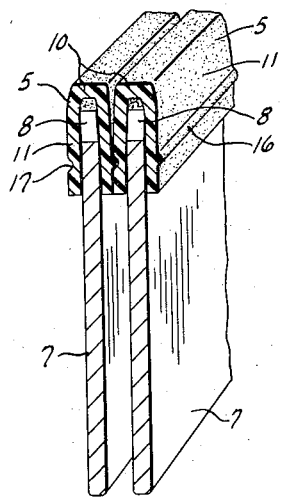
Figure 2 is an enlarged fragmentary view, partly in cross-section and partly in perspective, of two adjacent convolutions of the coiled and protected blade shown in Figure 1.

The tips of the teeth thus tend to wedge themselves into the bottom portion of the channel with the extremities of the teeth spaced slightly from the web 10 of the channel, as seen in Figure 2. Hence, the guard cooperates with the set of the teeth to hold itself on the band. Also, as a result of the teeth wedging themselves into the bottom portion of the channel, there is less danger of the guard and especially the web portion 10 thereof being pierced by the sharp corners on the tips of the teeth in the event the guard is subjected to blows which tend to force its web portion down onto the extremities of the teeth.

Figure 4:
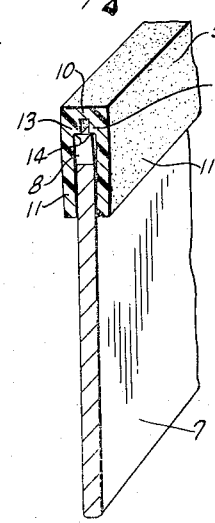
Figure 4 is an enlarged view of a portion of a band saw blade, partly in cross-section and partly in perspective, but showing a modified type of guard in place on and protectively covering the cutting edge of the blade.
Figure 5:
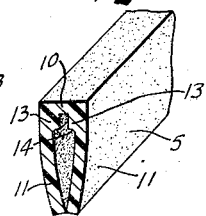
Figure 5 is an enlarged view partly in cross-section and partly in perspective of the guard per se shown in Figure 4.

If desired, further assurance may be had against damage to the guard by the extremities of the teeth through the expedient illustrated in Figure 4. The slightly modified guard 12 therein shown is also of narrow channel shaped cross section providing a web portion 10 and opposite flanges 11 projecting therefrom. The web portion 10, however, is thickened as at 13 adjacent to its junctions with the flanges to provide laterally opposite shoulders 14 which extend the entire length of the guard and face away from the web 10 of the channel, toward the mouth thereof.

The tips of the teeth 8 on the cutting edge of a saw blade having the guard of Figure 4 in place thereon abut against the shoulders 14 so that the guard is not only precisely located or positioned upon the cutting edge of the blade but is also better protected against being pierced by the sharp lateral corners at the extremities of the teeth in the event of blows imposed upon the web portion 10 of the guard.

Another highly important feature of the guard of this invention is that due to its ability to clamp itself firmly in position along the cutting edge of a saw blade, and the flexibility of the material from which the band is made, the band saw blade to which it is applied may be rolled or wound into a coil 15, such as seen in Figure 1, without interference from the guard. Such coiling of band saw blades is customary to facilitate shipment and storage of the blades in as compact a manner as possible.

The guard of this invention, when coiled with the blade as seen in Figure 1, not only protects the saw teeth against damage which would otherwise result from contact of the tips of the teeth with objects at the adjacent end face of the coil, but also prevents rubbing contact between the teeth of adjacent convolutions. Moreover, the guard eliminates the possibility of the teeth 8 of the coiled blade rubbing along and scoring the side faces of the convolutions in the event of edgewise relative shifting thereof.

According to this invention edgewise relative shifting of the convolutions of the coiled blade is substantially precluded by reason of the provision of interlocking means on the flanges of the guard which are caused to interengage one another when the protected band is rolled up into a coil as in Figure 1. Referring to Figure 2 it will be seen that this interlocking means comprises a narrow longitudinally extending rib 16 on the exterior of one of the flanges 11, at a location intermediate the web portion 10 and the outer edge of the flange, and a groove 17 in the exterior of the other flange. The groove 17 complements the rib 16 both as to location on the guard and to size.

Thus, when the protected blade is coiled in the manner seen in Figures 1 and 2 the rib 16 on each convolution of the guard will be nestingly received in the groove 17 on an adjacent convolution of the guard to prevent relative shifting of said convolutions axially of the coil. When it is recalled that the guard is more or less clamped in position upon the cutting edge portion of the blade, it will be appreciated that the interlocking rib and groove configuration on the sides of the guard also substantially precludes relative edgewise motion of the blade convolutions.

From the foregoing description, taken together with the accompanying drawing, it will be readily apparent to those skilled in the art that the guard of this invention not only protects the cutting edges of saw blades, and especially the precision and carefully formed edges of metal cutting band saw blades, against damage incidental to handling of the blade during the final stages of its manufacture or during shipment and storage, but that it also minimizes the danger of injury to persons who must handle the blade. It will also be appreciated that because of the tough and resilient nature of the material from which the guard is formed, that the guard is capable of being used over and over upon the blade for which it was intended or others of the same size.

What is claimed as my invention is:

1. As an article of manufacture: a flatwise coiled band saw blade having adjacent convolutions, the teeth on adjacent convolutions being contiguous and disposed at one axial end of the coil; and a guard covering and protecting the teeth on each convolution against contact with the teeth on adjacent convolutions, said guard comprising a narrow channel shaped sheath of flexible substantially resilient but tough material such as plastic, substantially equal in length to that of the blade, and being coiled with the blade with its web portion transversely overlying and covering the tips of the teeth and its opposite flanges substantially snugly engaging opposite sides of the teeth and opposite face portions of the blade inwardly of the teeth so that the teeth and faces of the blade coact with the flanges of the guard to prevent accidental displacement of the guard from the blade, said flanges of the sheath also being provided with a narrow rib on the exterior of one of the flanges and a complementary groove in the exterior of the other flange, the rib of each convolution engaging in the groove of an adjacent convolution to interlock the convolutions of the sheath.

2. As an article of manufacture: a flatwise coiled band saw blade having adjacent convolutions, the teeth on adjacent convolutions being contiguous and disposed at one axial end of the coil; and a guard covering and protecting the teeth on each convolution against contact with the teeth on adjacent convolutions, said guard comprising a narrow channel shaped sheath of flexible substantially resilient but tough material such as plastic, substantially equal in length to that of the blade, and being coiled with the blade with its web portion transversely overlying and covering the tips of the teeth and its flanges substantially snugly engaging opposite sides of the teeth and opposite face portions of the blade inwardly of the teeth, the space between the flanges at their junctions with the web being substantially equal to the thickness of the untoothed portion of the blade, and the flanges being biased towards one another so that the flanges hug the sides of the blade and the teeth dig slightly into the flanges to prevent accidental displacement of the guard from the blade, and means on the outer faces of the flanges effecting a gripping engagement between adjacent convolutions of the guard, so that in additon to protecting the teeth the guard also prevents relative edgewise shifting between adjacent convolutions of the blade.

3. As an article of manufacture: a coiled band saw blade having adjacent convolutions and having teeth along one edge set to project laterally from the faces of the band so that the blade is widest at its toothed edge; and a guard covering the toothed edge of the blade and protecting the teeth on each convolution against contact with the faces of and teeth on adjacent convolutions, said guard comprising a narrow channel shaped sheath of flexible substantially resilient but tough material, such as plastic, substantially equal in length to the blade and being coiled with the blade, the sheath having flanges which overlie the sides of the teeth and areas of the opposite faces of the blade inwardly from its toothed edge and which flanges are shaped to enable the sheath to be readily coiled with the blade and to provide for intimate engagement of the flanges on adjacent convolutions over substantially their entire surfaces, said flanges being spaced apart at their bases a distance to wedgingly receive the toothed edge of the blade therebetween and converging toward their edges to a spacing normally less than the thickness of the blade inwardly of its toothed edge, the wedging engagement of the toothed edge of the blade in the bottom portion of the channel causing the flanges thereof to be spread apart and tensioned, so that the toothed edge portion of the blade is tightly gripped by the flanges, and the coiled condition of the sheath on the blade holding the outermost flange of the sheath stretched taut against the convex faces of the blade convolutions and holding the innermost flange of the sheath crowded against the concave faces of the blade convolutions to increase the grip of the flanges on the toothed edge portion of the blade.

References Cited in the file of this patent

UNITED STATES PATENTS

| | | |
|---|---|---|
| 1,879,873 | Hopkins | Sept. 27, 1932 |
| 2,310,140 | Wilkie | Feb. 2, 1943 |
| 2,343,715 | Taylor | Mar. 7, 1944 |
| 2,756,790 | Syndbad | July 31, 1956 |
| 2,761,477 | Sherman | Sept. 4, 1956 |

FOREIGN PATENTS

| | | |
|---|---|---|
| 13,751 | Great Britain | 1895 |
| 379,611 | Great Britain | Sept. 1, 1932 |